(12) United States Patent
Zhang et al.

(10) Patent No.: US 11,640,499 B2
(45) Date of Patent: May 2, 2023

(54) SYSTEMS, METHODS AND COMPUTER PROGRAM PRODUCTS FOR MINING TEXT DOCUMENTS TO IDENTIFY SEMINAL ISSUES AND CASES

(71) Applicant: RELX Inc., New York, NY (US)

(72) Inventors: Paul Zhang, Centerville, OH (US); Valentina Templar, Las Vegas, NV (US)

(73) Assignee: RELX INC., Miamisburg, OH (US)

( * ) Notice: Subject to any disclaimer, the term of this patent is extended or adjusted under 35 U.S.C. 154(b) by 643 days.

(21) Appl. No.: 16/231,697

(22) Filed: Dec. 24, 2018

(65) Prior Publication Data

US 2019/0197100 A1    Jun. 27, 2019

Related U.S. Application Data

(60) Provisional application No. 62/610,356, filed on Dec. 26, 2017.

(51) Int. Cl.
*G06F 40/205* (2020.01)
*G06F 16/9032* (2019.01)
(Continued)

(52) U.S. Cl.
CPC .......... *G06F 40/205* (2020.01); *G06F 16/906* (2019.01); *G06F 16/9032* (2019.01);
(Continued)

(58) Field of Classification Search
None
See application file for complete search history.

(56) References Cited

U.S. PATENT DOCUMENTS 6,502,081 B1    12/2002  Wiltshire et al.
6,772,149 B1 *   8/2004  Morelock ............. G06F 16/334
(Continued)

FOREIGN PATENT DOCUMENTS

WO    1997012334 A1    4/1997
WO    2005109249 A1    11/2005

OTHER PUBLICATIONS

PCT International Search Report and Written Opinion of the International Searching Authority for PCT/US2018/067441, dated Apr. 9, 2019, 12 pages.

*Primary Examiner* — Alex Gofman
*Assistant Examiner* — Umar Mian
(74) *Attorney, Agent, or Firm* — Dinsmore & Shohl LLP (57) ABSTRACT

Embodiments of the present disclosure are directed to systems, methods, and computer product programs to identify one or more seminal cases within a database containing legal case data. The disclosed systems and methods provide an approach to identify one or more seminal cases for particular legal issues by mining a text database containing electronic legal documents for the reasons for citing and mining the text within to determine whether the legal issue addressed in the reasons for citing is directed to a seminal case. The data is created through data mining and obtained from the plurality the reasons for citing identifying the seminal cases for a particular legal issue such that the output data corresponding to the seminal cases causes an external device to distinguish the seminal cases when one or more of the seminal cases are returned as the result of a search.

20 Claims, 7 Drawing Sheets

(51) Int. Cl.
  *G06F 16/906* (2019.01)
  *G06Q 50/18* (2012.01)
  *G06F 40/169* (2020.01)
  *G06F 40/258* (2020.01)
  *G06F 40/284* (2020.01)

(52) U.S. Cl.
  CPC .......... *G06F 40/169* (2020.01); *G06F 40/258* (2020.01); *G06F 40/284* (2020.01); *G06Q 50/18* (2013.01)

(56) References Cited

U.S. PATENT DOCUMENTS

| | | | |
|---|---|---|---|
| 7,464,025 | B2 | 12/2008 | Humphrey et al. |
| 7,814,102 | B2 | 10/2010 | Miller |
| 8,396,882 | B2 | 3/2013 | Zhang et al. |
| 8,768,911 | B2 | 7/2014 | Armstrong |
| 9,177,050 | B2 | 11/2015 | Lu et al. |
| 9,183,203 | B1 | 11/2015 | Tuchman et al. |
| 9,201,969 | B2 | 12/2015 | Zhang et al. |
| 9,471,672 | B1 | 10/2016 | Walters et al. |
| 9,483,472 | B2 | 11/2016 | Rhoads et al. |
| 2004/0064438 | A1* | 4/2004 | Kostoff .................... G06F 16/35 |
| 2005/0108001 | A1* | 5/2005 | Aarskog ............... G06F 40/289 704/10 |
| 2006/0020607 | A1 | 1/2006 | Patterson |
| 2006/0041608 | A1 | 2/2006 | Miller |
| 2006/0149720 | A1 | 7/2006 | Dehlinger |
| 2007/0130100 | A1 | 6/2007 | Miller |
| 2009/0234816 | A1* | 9/2009 | Armstrong ............ G06F 16/338 |
| 2010/0125601 | A1* | 5/2010 | Jackson ............... G06F 16/3334 707/780 |
| 2011/0208769 | A1* | 8/2011 | Kemp .................... G06Q 50/18 707/769 |
| 2012/0054240 | A1 | 3/2012 | Zhang et al. |
| 2013/0144909 | A1 | 6/2013 | Zhang et al. |
| 2013/0204671 | A1 | 8/2013 | Weertman |
| 2013/0297540 | A1* | 11/2013 | Hickok ................ G06N 3/0472 706/21 |
| 2014/0180935 | A1* | 6/2014 | Rhoads ................... G06F 16/93 705/311 |
| 2014/0214825 | A1* | 7/2014 | Zhang ................ G06F 16/9535 707/732 |
| 2017/0076203 | A1 | 3/2017 | Knight et al. |
| 2017/0364827 | A1 | 12/2017 | Conrad et al. |

\* cited by examiner

SYSTEMS, METHODS AND COMPUTER PROGRAM PRODUCTS FOR MINING TEXT DOCUMENTS TO IDENTIFY SEMINAL ISSUES AND CASES

CROSS REFERENCE

This application claims priority to the U.S. Provisional Patent Application Ser. No. 62/610,356, filed on Dec. 26, 2017, and entitled "Systems, Methods and Computer Program Products for Mining Text Documents to Identify Seminal Cases" which is incorporated by reference herein in its entirety under 35 U.S.C. 119(e).

TECHNICAL FIELD

The present disclosure generally relates to electronic document processing and, more particularly, to systems, methods and computer program products for identifying and extracting seminal issues that are embedded in a legal database through data mining.

BACKGROUND

Legal scholars and other experts may sometimes identify legal cases that are considered influential in a particular area of law. These influential cases may be referred to as seminal cases. A seminal case addresses a significant legal issue and is often cited by subsequent cases that also address the same issue. For example, a seminal case may be the first case from the highest court in a jurisdiction to have decided a particular legal issue and state the proposition of law in question. In another example, a seminal case may be considered a case of importance that establishes a new law and sets new precedents. A seminal case may also be considered a case that is decided in a court of law that is used as an example to decide similar cases.

Seminal cases are often cited by attorneys and judges since they have legal significance. However, seminal cases are usually not well-known at the time of publication and when the case is logged into a database and made available for searching. Instead, the seminal case becomes more well-known over time as numerous attorneys and judges cite and rely upon the significant legal issue addressed by the case. Therefore, many seminal cases addressing a particular legal issue may not be marked or otherwise identified easily when stored in the database that is provided to search engines. As a result, users may not realize a case is a seminal case when conducting a search. Moreover, search engines that are configured to provide the most important cases at the top of the search results or otherwise distinguish the most important cases may not do so for seminal cases without having information that identifies certain cases as being seminal.

SUMMARY

In one embodiment, a system to identify one or more seminal cases that address a particular legal issue is provided. The system includes a processing device; and a non-transitory, processor-readable storage medium in communication with the processing device. The non-transitory, processor-readable storage medium includes one or more programming instructions that, when executed, cause the processing device to obtain an electronic legal document comprising a plurality of text from a repository, search the plurality of text of the electronic legal document for a plurality of reasons for citing comprising a plurality of legal issues text, search the plurality of reasons for citing to identify a plurality of seminal clues and generate a data list from the plurality of reasons for citing having the plurality of seminal clues to identify a plurality of potential seminal cases, filter the data list containing the plurality of potential seminal cases to identify only seminal cases based on a calculated seminal reference frequency and generate a working corpus from the filtered data list, and output data corresponding to the seminal cases from the working corpus such that the data causes an external device to distinguish the seminal cases when one or more of the seminal cases are returned as the result of a search.

In another embodiment, a method to identify one or more seminal cases that address a particular legal issue is provided. The method includes obtaining, by a processing device, an electronic legal document comprising a plurality of text from a repository, searching, by the processing device, the plurality of text of the electronic legal document for a plurality of reasons for citing comprising a plurality of legal issues text and searching, by the processing device, the plurality of reasons for citing to identify a plurality of seminal clues. The method further includes generating, by the processing device, a data list from the plurality of reasons for citing having the plurality of seminal clues to identify a plurality of potential seminal cases, filtering, by the processing device, the data list containing the plurality of potential seminal cases to identify only seminal cases based on a calculated seminal reference frequency and generate a working corpus from the filtered data list, mining, by the processing device, the plurality of legal issues text from the plurality of reasons for citing of all the seminal cases in the working corpus to establish sentence data that contains a plurality of sentences comprising a plurality of legal discussions from the plurality of legal issues text of the seminal case in the working corpus, and assigning, by the processing device, a unique identifier to each sentence of the plurality of sentences that references the seminal cases. Further, the method includes collecting, by the processing device, each sentence of the plurality of sentences from the sentence data and storing the collected sentences from the sentence data as temporary sentence data for each of the seminal cases in the working corpus and, applying, by the processing device, a text clustering algorithm to the temporary sentence data to create a plurality of text clusters, selecting, by the processing device, a top cluster from the plurality of text clusters, wherein the top cluster comprises one or more sentences surrounding the plurality of legal discussions and the plurality of legal issues text identified with each of the seminal cases, and outputting, to a user display device, data corresponding to the seminal cases from the working corpus such that the data causes the user display device to distinguish the seminal cases when one or more of the seminal cases are returned as the result of a search.

In yet another embodiment, a non-transitory, computer-readable storage medium that is operably by a computer to identify one or more seminal cases that address a particular legal issue is provided. The non-transitory, computer-readable storage medium having one or more programming instructions stored thereon cause a processing device to obtain an electronic legal document comprising a plurality of text from a repository, search the plurality of text of the electronic legal document for a plurality of reasons for citing comprising a plurality of legal issues text, search the plurality of reasons for citing to identify a plurality of seminal clues and generate a data list from the plurality of reasons for citing having the plurality of seminal clues to identify a plurality of potential seminal cases, filter the data list containing the plurality of potential seminal cases to identify only seminal cases based on a calculated seminal reference frequency and generate a working corpus from the filtered data list, and output data corresponding to the seminal cases from the working corpus such that the data causes an external device to distinguish the seminal cases when one or more of the seminal cases are returned as the result of a search.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 6 schematically depicts a graphical user interface having a legal issue query field and a result listing according to one or more embodiments described and illustrated herein.

DETAILED DESCRIPTION

Embodiments of the present disclosure are directed to systems, methods, and computer product programs to identify one or more seminal cases within a database containing legal case data. More specifically, the disclosed systems and methods provide an approach to identify one or more seminal cases and the legal issues that are addressed by a particular seminal case by mining a text database containing electronic legal documents. Conventionally, seminal cases and their corresponding legal issues stored in a database are not marked or otherwise identified when they are initially added to a database. This is because it is usually not known at the time of publication whether a case will eventually become particularly significant in a particular field of law. Further, the case may only be considered seminal for one legal issue among the many legal issues the case may have addressed. As such, the process described herein, in identifying seminal cases, generating data corresponding to the seminal cases, and providing or transmitting the data to an external device that uses the data to surface the seminal cases to the top of a search results listing or otherwise indicate the seminal cases improves the functioning of the external device in providing the most relevant information to a user. That is, search results produced as a result of the processes described herein may only cater to or boost a particular case when the case's seminal issue meets a particular user's search needs.

Various systems, methods, and computer product programs for identifying seminal cases by mining text document databases are described in detail herein.

Figure 1:
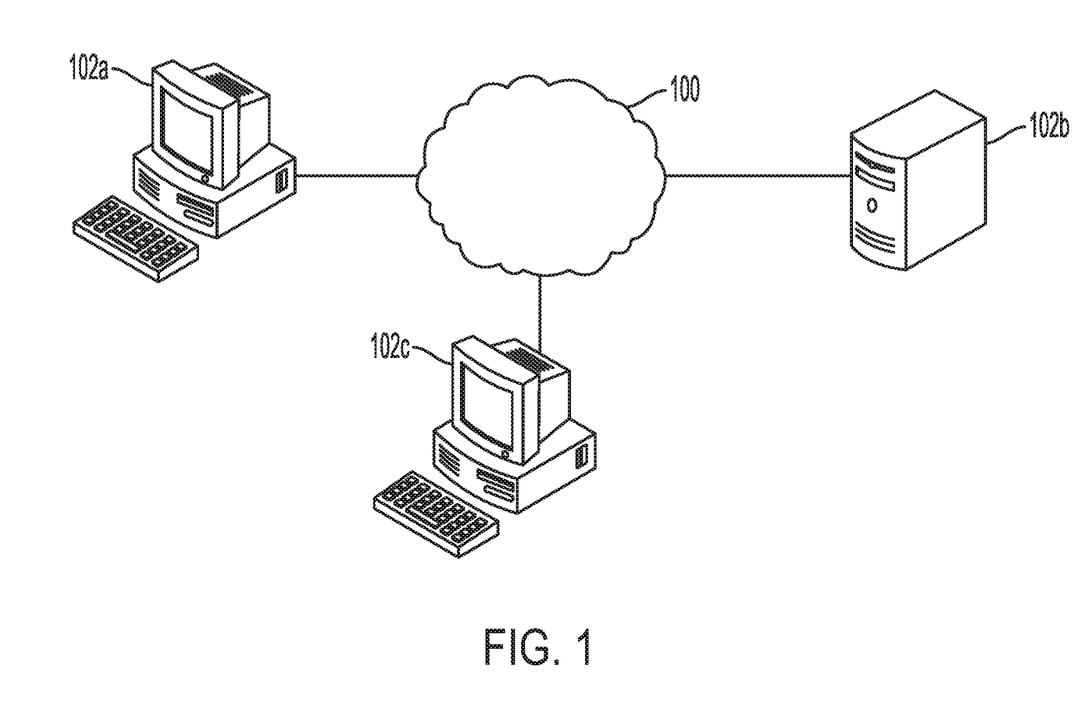
FIG. 1 schematically depicts an illustrative computing network for a system for mining text document data to identify one or more seminal cases that address a particular legal issue according to one or more embodiments described and illustrated herein.

Referring now to the drawings, FIG. 1 depicts an illustrative computing network that depicts components for a system for mining text documents to identify seminal cases, according to embodiments shown and described herein. As illustrated in FIG. 1, a computer network 100 may include a wide area network (WAN), such as the internet, a local area network (LAN), a mobile communications network, a public service telephone network (PSTN) a personal area network (PAN), a metropolitan area network (MAN), a virtual private network (VPN), and/or another network. The computer network 100 may generally be configured to electronically connect one or more computing devices and/or components thereof. Illustrative computing devices may include, but are not limited to, a user computing device 102a, a case mining device 102b, and an administrator computing device 102c.

The user computing device 102a may generally provide an interface between a user and the other components connected to the computer network 100. Thus, the user computing device 102a may be used to perform one or more user-facing functions, such as receiving one or more inputs from a user or transmitting data or information such as data related to initiating an electronic search query for one or more legal issues. More specifically, to perform an electronic search query, the user computing device 102a may present a user with a user interface that allows the user to enter the one or more legal issues to be searched. The user interface may be configured to receive a search request from the user, initiate the search, and utilize data received from the case mining device 102b when displaying search results, as described in greater detail herein. The search request may include terms and/or other data for retrieving a document. The components and functionality of the user computing device 102a will be set forth in detail below.

Additionally, included in FIG. 1 is the administrator computing device 102c. In the event that the case mining device 102b requires oversight, updating, or correction, the administrator computing device 102c may be configured to provide the desired oversight, updating, and/or correction. The administrator computing device 102c may also be used to input additional data into a data storage portion of the case mining device 102b. For example, the administrator computing device 102c may edit headnotes. It should be appreciated that headnotes may be points of a case drawn directly from the language of the court by attorney-editors. As headnotes are generally understood, they are not discussed in further detail herein.

The case mining device 102b may search a document database using one or more legal issues to identify a result set of documents. The case mining device 102b may also determine potential seminal case keywords or clues to identify seminal cases related to the result set of documents that is indicative of a seminal case for each legal issue. The case mining device 102b may also transmit information to the user computing device 102a such that the user computing device 102a may display the result set of documents and information pertaining to the result set of documents, with the seminal cases displayed at a top of the resulted set of documents and information. The case mining device 102b may provide or transmit data to an external device, such as the user computing device 102a, to surface or otherwise indicate the discovered seminal cases. The components and functionality of the case mining device 102b will be set forth in detail below.

It should be understood that while the user computing device 102a and the administrator computing device 102c are depicted as personal computers and the case mining device 102b is depicted as a server, these are merely examples. More specifically, in some embodiments, any type of computing device (e.g., mobile computing device, personal computer, server, and the like) may be utilized for any of these components. Additionally, while each of these computing devices is illustrated in FIG. 1 as a single piece of hardware, this is also an example. More specifically, each of the user computing device 102a, the case mining device 102b, and the administrator computing device 102c may represent a plurality of computers, servers, databases, and the like.

In addition, it should be understood that while the embodiments depicted herein refer to a network of computing devices, the present disclosure is not solely limited to such a network. For example, in some embodiments, the various processes described herein may be completed by a single computing device, such as a non-networked computing device or a networked computing device that does not use the network to complete the various processes described herein.

Figure 2A:
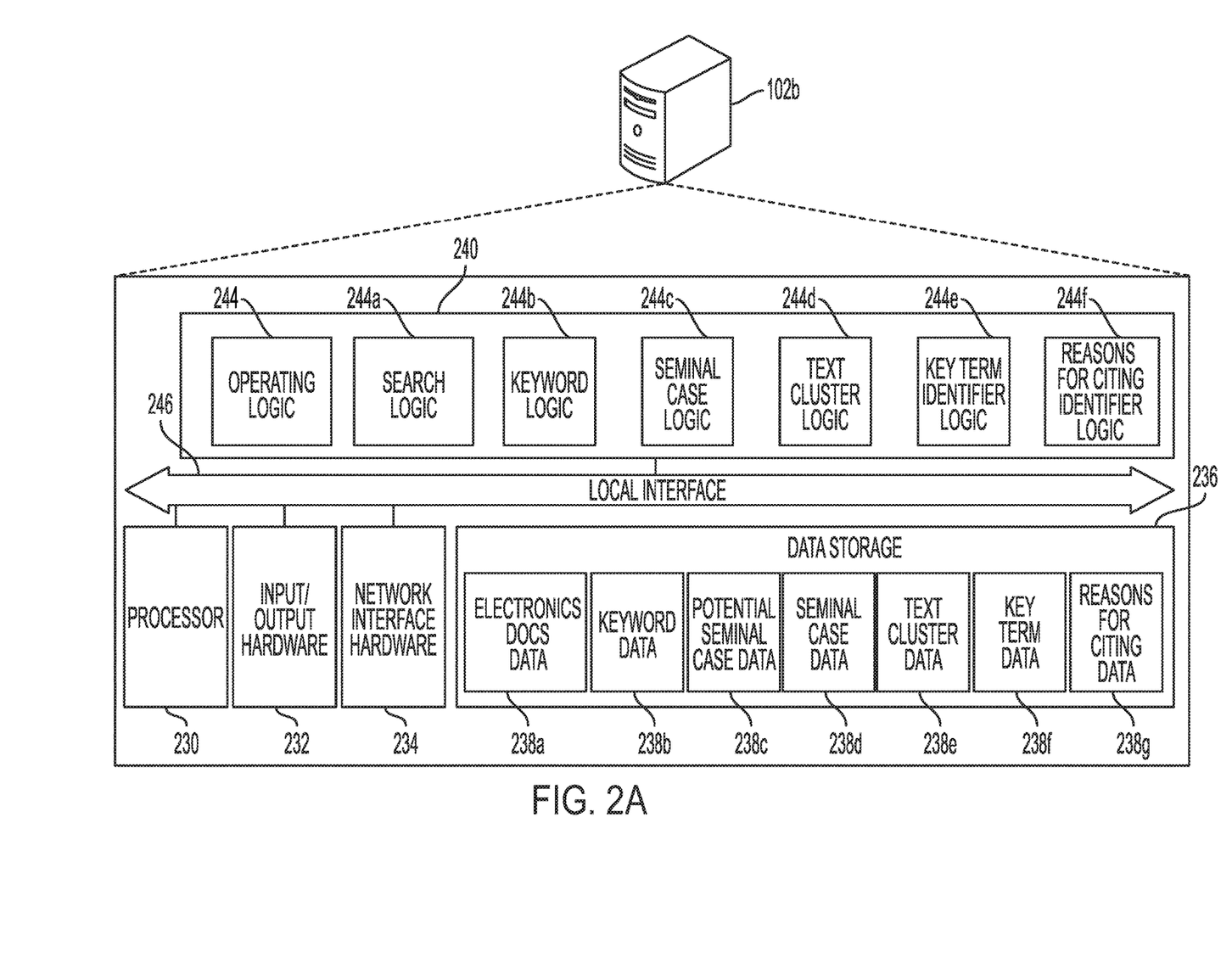
FIG. 2A schematically depicts case mining device from FIG. 1, further illustrating hardware and software components that may be used to mine text document data to identify one or more seminal cases that address a particular legal issue according to one or more embodiments described and illustrated herein.

FIG. 2A depicts the case mining device 102b, further illustrating a system that identifies one or more seminal cases and their corresponding legal issues by utilizing hardware, software, and/or firmware, according to embodiments shown and described herein. The case mining device 102b may include a non-transitory, computer readable medium configured for searching a document corpus or identifying text that surrounds a plurality of reasons for citing, headnotes, and/or the like embodied as hardware, software, and/or firmware, according to embodiments shown and described herein.

While in some embodiments, the case mining device 102b may be configured as a general purpose computer with the requisite hardware, software, and/or firmware, in other embodiments, the case mining device 102b may be configured as a special purpose computer designed specifically for performing the functionality described herein. For example, the case mining device 102b may be a specialized device that particularly determines case citations, the plurality of reasons for citing, headnotes, and/or the like located within the text of electronic documents. In a further example, the case mining device 102b may be a specialized device that further searches a plurality of legal issues text of each of the plurality of reasons for citing to identify a plurality of seminal clues and generates a data list from the plurality of legal issues text having the plurality of seminal clues to identify a plurality of potential seminal cases. The case mining device 102b then provides the generated data list to an external component (e.g., the user computing device 102a (FIG. 1)) for the purposes of improving the accuracy of an external component when the external component executes a search and provides results to a user that are ranked according to the importance (e.g., seminal cases are more important than other cases) or are otherwise indicated within the displayed search results.

As also illustrated in FIG. 2A, the case mining device 102b may include a processor 230, input/output hardware 232, network interface hardware 234, a data storage component 236, which stores a database of electronic documents data 238a, keyword data 238b, potential seminal case data 238c, seminal case data 238d, a top text cluster data 238e, key term data 238f, a reason for citing data 238g or headnote data, and a memory component 240. The memory component 240 may be non-transitory computer readable memory. The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 244, search logic 244a, keyword logic 244b, seminal case identification logic 244c, text clustering logic 244d, key term identifying logic 244e, and reason for citing identifier logic 244f (each of which may be embodied as a computer program, firmware, or hardware, as an example). A local interface 246 is also included in FIG. 2A and may be implemented as a bus or other interface to facilitate communication among the components of the case mining device 102b. It should be understood that the processor 230, memory component 240 and various logic modules such as search logic 244a, keyword logic 244b, seminal case identification logic 244c, text clustering logic 244d, key term identifying logic 244e, and reason for citing identifier logic 244f may define a computer-program product for identifying seminal cases by mining text document databases.

The processor 230 may include any processing component(s) configured to receive and execute instructions (such as from the data storage component 236 and/or memory component 240). The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 236 may reside local to and/or remote from the case mining device 102b and may be configured to store one or more pieces of data for access by the case mining device 102b and/or other components, determine the reasons for citing, and/or determine whether seminal clues are present. As illustrated in FIG. 2A, the data storage component 236 stores a database of electronic documents data 238a. As mentioned above, the electronic documents may include legal documents (i.e., cases, briefs, and/or the like) that have been organized and indexed for searching. The keyword data 238b stores potential keywords or seminal clues that may be used to identify a potential seminal case. For example, potential seminal cases may be identified by determining whether the reasons for citing on subsequent cases that cite a particular case include a plurality of keywords or seminal clues. These keywords or seminal clues are indicators that the opinion in the reason for citing or headnote represents a belief and authoritative thinking of the authoring judge has placed significance and/or influence on the cited case in terms of the specific piece of law discussed. The keywords or seminal clues may include, but not limited to: a seminal case, a seminal decision, a seminal opinion, a seminal ruling, a seminal decision, a seminal holding, a landmark case, a landmark decision, a landmark opinion, a landmark holding, a landmark ruling, a leading case, a leading decision, a leading opinion, a leading holding, a leading ruling, and the like. In one particular example, a subsequent case may indicate a previous case as being seminal if the opinion text of the subsequent case states "In this seminal Fourth Amendment case, decided 120 years ago, the Court wrote, in frequently quoted language, that the Fourth Amendment's prohibitions apply 'to all invasions on the part of the government and its employees of the sanctity of a man's home and the privacies of life.'" The potential seminal case data 238c may include the potential seminal cases that were identified by the keywords or seminal clues.

The seminal case data 238d includes a plurality of sentences that have had a unique identifier assigned based on containing citations to seminal cases as well as any cases that have been identified as a seminal case by the keywords or seminal clues contained in the keyword data 238b. For example, the reasons for citing may include the keywords or the seminal clues (i.e., using the terms "seminal", "leading", and the like) in the authoring judge's opinion referring to a particular case or legal issue that is subsequent to the seminal case but that the authoring judge has decided that the seminal case is precedent in the subsequent case. The seminal case data 238d includes only seminal cases that have been filtered from the potential seminal case data 238c. More specifically, the seminal case data 238d includes only seminal cases that have been filtered by determining, based on a preset frequency of the keywords or the seminal clues in the reasons for citing or headnotes, whether the case is seminal (e.g., keywords such as "seminal", "leading", "generational", and/or the like). It should be appreciated that generally, the higher the frequency of the keywords or seminal clues, the more likely the case is a seminal case. The top text cluster data 238e includes one or more text clusters that are identified to potentially address the seminal issue for one of the seminal cases. The top text cluster data 238e includes one or more sentences that discuss the seminal legal issue for a specific seminal case (e.g., "A state may apply a clear and convincing evidence standard in proceedings where a guardian seeks to discontinue nutrition and hydration of a person diagnosed to be in a persistent vegetative state"). The key term data 238f may include a set of key terms that represent a particular seminal issue. As discussed herein, the set of key terms may be normalized by the system to capture specific terms that may be spelled or referred to in a variety of approaches. As such, the key term data 228f may also include any variations of the set of key terms e.g., based on the example sentence above, the key terms may be: "state"; "apply"; "clear"; "clear and convincing"; "clear and convincing evidence"; "convince"; "convincing evidence"; "convincing evidence standard"; "evidence"; "evidence standard"; "standard"; "proceeding"; "guardian"; "seek"; "discontinue"; "nutrition"; "hydration"; "person"; "diagnose"; "persistent"; "persistent vegetative state"; "vegetative"; "vegetative state", and/or the like). The reason for citing data 238g may include the plurality of reasons for citing or headnotes and a plurality of terms for each of the plurality of reasons for citing, headnotes, and the like, where each term of the plurality of terms may represent the seminal legal issue addressed by a particular seminal case.

Included in the memory component 240 are the operating logic 244, search logic 244a, keyword logic 244b, seminal case identification logic 244c, text clustering logic 244d, key term identifying logic 244e, and reason for citing identifier logic 244f. The operating logic 244 may include an operating system and/or other software for managing components of the case mining device 102b. The search logic 244a may contain programming instructions to facilitate electronic searches during a data generation process as described in greater detail herein. Further, the search logic 244a may contain programming instructions to mine the electronic documents for legal topics and sort, store, categorize, and/or the like any cases relating to those topics. The search logic 244a may transmit data to the search computer (i.e., the user computing device 102a) so that the search computer knows which cases are the seminal cases when a search request is received and a results list is generated, as discussed in greater detail herein. As such, the search computer (i.e., the user computing device 102a) has information that triggers the search computer to move those seminal cases up to the top of the search result list or otherwise distinguish the search results (e.g., highlight, star, and/or the like) so a user knows that the cases distinguished in the search results or at the top of the result lists are seminal cases when reviewing the results list.

The keyword logic 244b may contain programming instructions to select the electronic documents data 238a, search the electronic documents data 238a, identify the reason for citing text from the search of the electronic documents data 238a, and identify one or more keywords within the reason for citing text that indicate a potential seminal case. The keyword logic 244b may save the one or more keywords as the keyword data 238b. The seminal case identification logic 244c may contain programming instructions to identify one or more seminal cases based on the frequency that the keywords in the keyword data 238b are mentioned within a potential seminal case stored in the potential seminal case data 238c. The text clustering logic 244d may be an algorithm configured to utilize text clustering to identify the top text cluster data 238e. The algorithm of the text clustering logic 244d may identify one or more sentences within the text of the reason for citing of a seminal case that is stored in the seminal case data 238d. The key term identifying logic 244e may contain programming instructions to identify the set of key terms of the key term data 238f by searching the sentences of the top text cluster data 238e. As mentioned above, the key term identifying logic 244e may also normalize the key terms. The citing identifier logic 244f may contain programming instructions to select one or more reasons for citing or headnotes that are stored in the reason for citing data 238g based on a semantic distance between a plurality of terms for each of the plurality of reasons for citing or headnotes and the normalized key terms as discussed in greater detail herein. As mentioned above, the selected plurality of reasons for citing or headnotes represent the seminal issue addressed by the seminal case.

It should be understood that the components depicted in FIG. 2A are merely illustrative and are not intended to limit the scope of this disclosure. More specifically, while the components in FIG. 2A are illustrated as residing within the case mining device 102b, this is a nonlimiting example. In some embodiments, one or more of the components may reside external to the case mining device 102b. Similarly, while FIG. 2A is directed to the case mining device 102b, other components such as the user computing device 102a and the administrator computing device 102c may include similar hardware, software, and/or firmware.

Figure 2B:
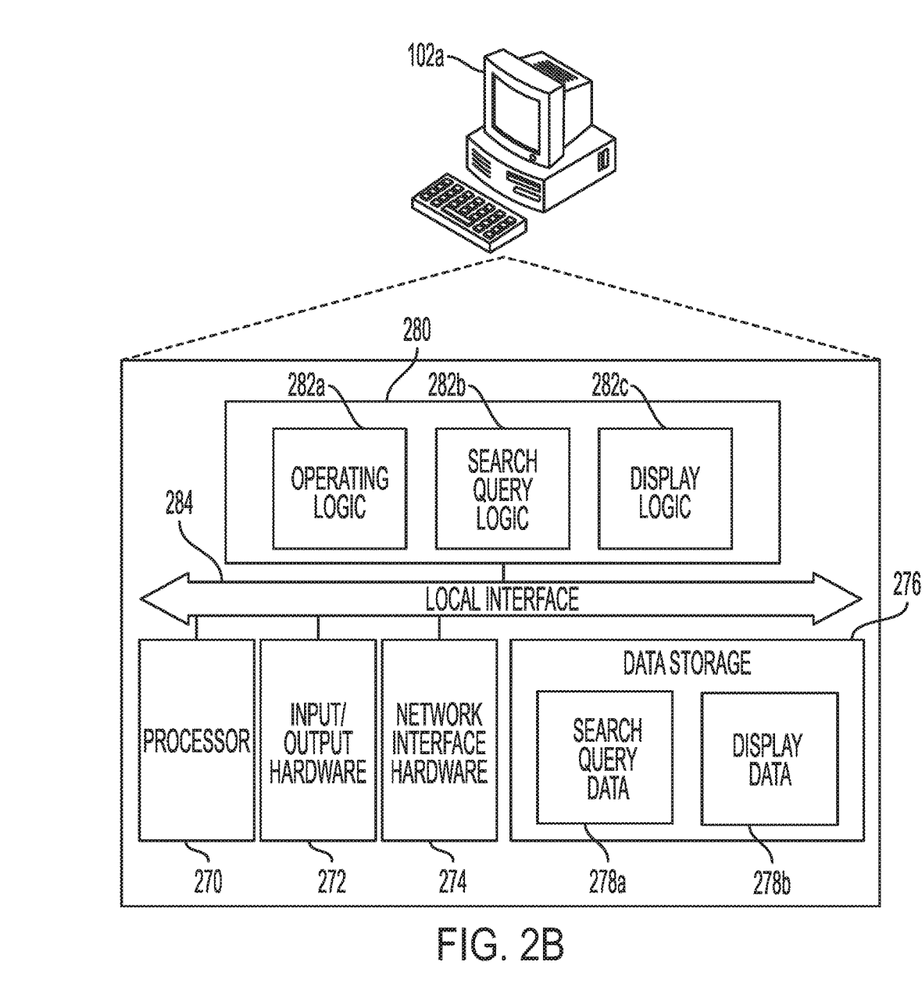
FIG. 2B schematically depicts the user computing device from FIG. 1, further illustrating hardware and software components that may be used to initiated a search query to identify one or more seminal cases that address a particular legal issue according to one or more embodiments described and illustrated herein.

FIG. 2B depicts the user computing device 102a further illustrating a system that identifies a search query by utilizing hardware, software, and/or firmware, according to embodiments shown and described herein. In addition, the user computing device 102a may include a non-transitory, computer readable medium configured for displaying and transmitting a search query initiated by a user embodied as hardware, software, and/or firmware, according to embodiments shown and described herein.

While, in some embodiments, the user computing device 102a may be configured as a general purpose computer with the requisite hardware, software, and/or firmware, in other embodiments, the user computing device 102a may be configured as a special purpose computer designed specifically for performing the functionality described herein. For example, the user computing device 102a may be a specialized device that displays a user interface for inputting a search query for at least one legal issue and displays a plurality of generated results of the search query with the seminal cases of a searched legal issue displayed at the top of the search results or otherwise indicated within the search results for the purposes of improving the accuracy of the search results that are provided to a user.

As also illustrated in FIG. 2B, the user computing device 102a may include a processor 270, input/output hardware 272, network interface hardware 274, data storage component 276, which stores a database of search query data 278a and display data 278b, and a memory component 280. The memory component 280 may be non-transitory computer readable memory. The memory component 280 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 280 may be configured to store operating logic 282a, search query logic 282b, and display logic 282c (each of which may be embodied as a computer program, firmware, or hardware, as an example). A local interface 284 is also included in FIG. 2B and may be implemented as a bus or other interface to facilitate communication among the components of the user computing device 102a.

The processor 270 may include any processing component(s) configured to receive and execute instructions (such as from the data storage component 276 and/or memory component 280). The input/output hardware 272 may include a monitor, keyboard, mouse, printer, camera, microphone, speaker, and/or other device for receiving, sending, and/or presenting data. The network interface hardware 274 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 276 may reside local to and/or remote from the user computing device 102a and may be configured to store one or more pieces of data for access by the user computing device 102a and/or other components, store data that may be received from an external device (e.g., the case mining device 102b) such as the search query data 278a, and/or store data to be displayed. As illustrated in FIG. 2B, the data storage component 276 stores a database of search query data 278a. As mentioned above, the search query data 278a may include data related to a searched legal issue and/or data received from an external device (i.e., the case mining device 102b). The display data 278b may include data relating to the data to be displayed. For instance, the display data 278b may include the order or otherwise distinguished cases to be displayed on the user computing device 102a, such as the case mining device 102b.

Included in the memory component 280 are the operating logic 282a, search query logic 282b, and display logic 282c. The operating logic 282a may include an operating system and/or other software for managing components of the user computing device 102a. The search query logic 282b may contain programming instructions to facilitate user initiated electronic searches or queries. The search query logic 282b may be configured to compile, organize, and/or display electronic documents and other data into an order, such as at the top of a search result list or otherwise indicate and/or distinguish the seminal cases for the seminal legal issues that is recognizable when displayed to a user. The search query logic 282b may also be configured to provide data for a user interface to or a display device of the user computing device 102a.

The display logic 282c may display a graphical user interface usable by a user of the user computing device 102a to provide electronic document search queries, to display visualizations of a plurality of metadata associated with the selected plurality of reasons for citing or headnotes representing the at least one seminal issue addressed by the at least one seminal case, and to display of the result of the metadata associated with the selected plurality of reasons for citing or headnotes representing the at least one seminal issue addressed by the at least one seminal case. The display logic 282c may generally be configured to display information on a display of the user computing device 102a. The functionalities of the operating logic 282a, the search query logic 282b, and the display logic 282c will be described in further detail below.

It should be understood that the components depicted in FIG. 2B are merely illustrative and are not intended to limit the scope of this disclosure. More specifically, while the components in FIG. 2B are illustrated as residing within the user computing device 102a, this is a nonlimiting example. In some embodiments, one or more of the components may reside external to the user computing device 102a. Similarly, while FIG. 2B is directed to the user computing device 102a, other components such as the administrator computing device 102c may include similar hardware, software, and/or firmware.

Figure 3:
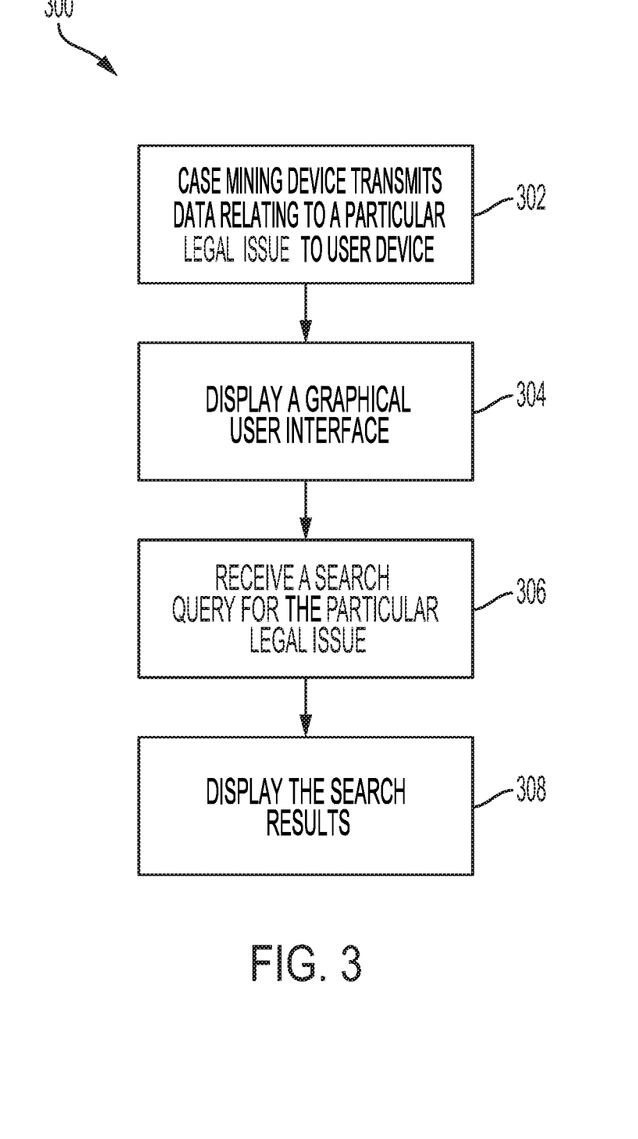
FIG. 3 depicts a flow diagram of an illustrative method of facilitating a key seminal issue search query according to one or more embodiments shown and described herein.

Referring now to FIG. 3, a flow diagram that graphically depicts an illustrative method 300 of facilitating a key seminal issue search query is provided. Although the steps associated with the blocks of FIG. 3 will be described as being separate tasks, in other embodiments, the blocks may be combined or omitted. Further, while the steps associated with the blocks of FIG. 3 will described as being performed in a particular order, in other embodiments, the steps may be performed in a different order.

Still referring to FIG. 3, at block 302, the case mining device 102b (FIG. 1) may transmit data relating a particular legal issue and to the seminal cases for that particular legal issue to the user computing device 102a (FIG. 1). The transmitted data or information from the case mining device 102b (FIG. 1) to the user computing device 102a (FIG. 1) is for the user computing device 102a (FIG. 1) to know which cases are seminal cases so to move to cases to the top of the search results list or otherwise indicate or distinguish the seminal cases from other cases. That is, the case mining device 102*b* (FIG. 1) may generate data or information to be displayed with the display logic 282*c* (FIG. 2B). It should be appreciated that the transmitted data from the case mining device 102*b* (FIG. 1) has already been compiled by the case mining device 102*b* (FIG. 1) previous to any search request and that the case mining device 102*b* (FIG. 1) may automatically transfer the data at predetermined times and/or intervals.

At block 304, a graphical user interface is displayed. In some embodiments, the graphical user interface is displayed on a display device of the user computing device 102*a* (FIG. 1). The graphical user interfaces described herein may display the seminal cases based on a legal issue search in an intuitive and user-friendly manner such that at least one seminal case for the legal issue that the user queried may be displayed at a top of a search result listing or otherwise be indicated or distinguished from the other cases in search results. In some embodiments, the computer network 100 is the Internet and the graphical user interfaces described herein are presented to the user on a display device of the user computing device 102*a* via a web browser.

Still referring to FIG. 3, at block 306, a search query may be generated by the user and be received by the user computing device 102*a* (FIG. 1). In some embodiments, the search query received at block 306 may have been entered into a query input or field of search of the graphical user interface displayed by the user computing device 102*a* (FIG. 1). The user interface may be configured to receive a search request from the user and to initiate the search. Once the search query is received, the user computing device 102*a* (FIG. 1), in response to initiation of the search by the user (i.e., by pressing enter or selecting a search initiation icon or by entering text, which is automatically searched), may perform a search query for the data or information relating to the one or more legal issues that a user is querying and display the search results at block 308. The search results may use the data received from the case mining device 102*b* (FIG. 1) to indicate which of the cases related to the legal issues queried are seminal cases when the cases are displayed in search results by moving to cases to the top of the search results list or otherwise indicating or distinguishing the seminal cases from other cases.

Figure 4:
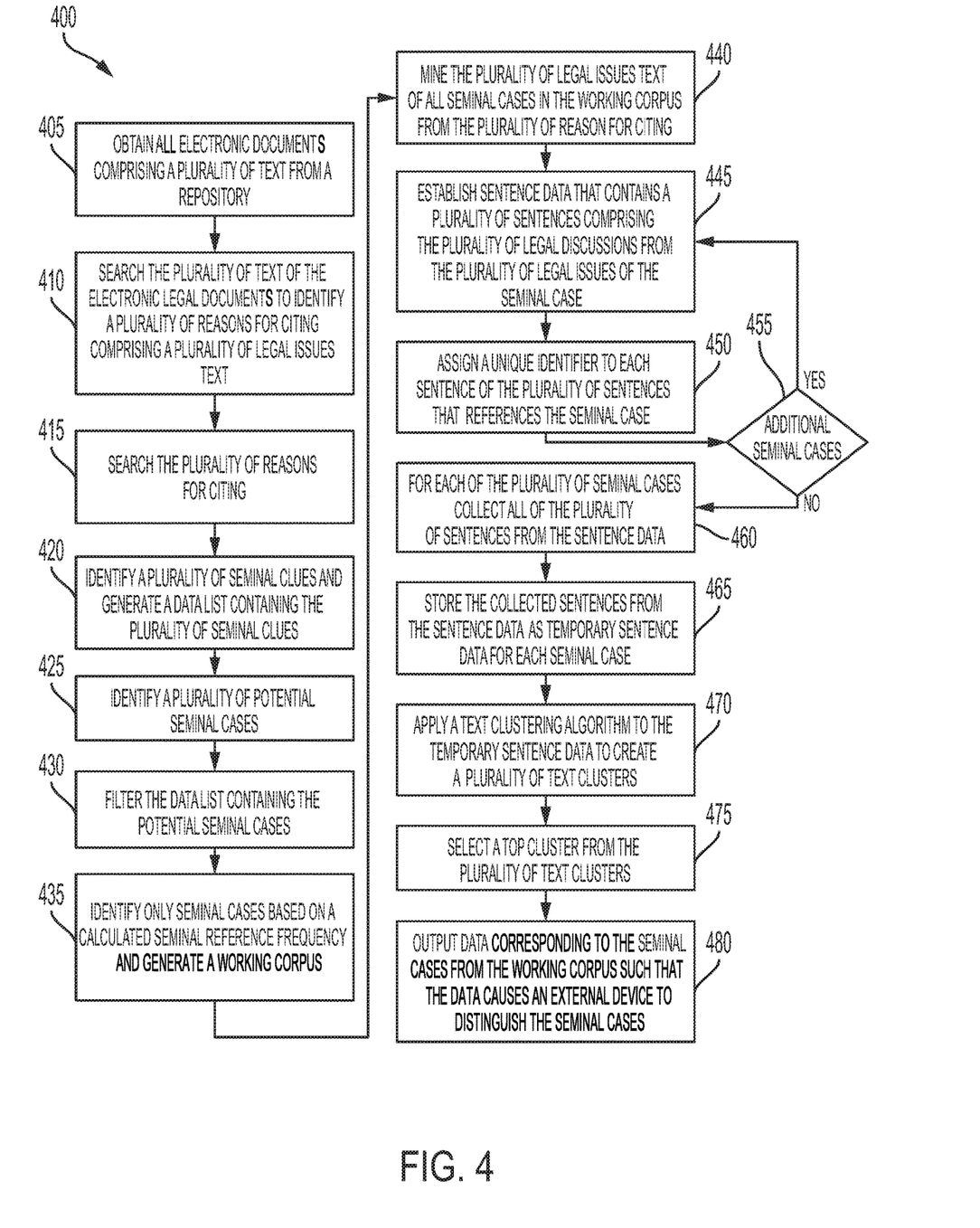
FIG. 4 depicts a flow diagram of an illustrative method of mining text document data to identify one or more seminal cases that address a particular legal issue according to one or more embodiments shown and described herein.

Referring now to FIG. 4, a flow diagram that graphically illustrates an illustrative method 400 of mining text document data to identify one or more seminal cases that address a particular legal issue according to one or more embodiments is provided. Although the steps associated with the blocks of FIG. 4 will be described as being separate tasks, in other embodiments, the blocks may be combined or omitted. Further, while the steps associated with the blocks of FIG. 4 will described as being performed in a particular order, in other embodiments, the steps may be performed in a different order. As a result of the processes described herein with respect to FIG. 4, data is generated that can be used by an external device (e.g., the user computing device 102*a* (FIG. 1) to complete one or more additional processes with the generated data (e.g., conduct a search and indicate seminal cases in the search results).

Still referring to FIG. 4, the system obtains, during the data generation process, all electronic documents from a corpus (e.g., a legal corpus) at block 405. The electronic documents may be obtained, for example, from a repository containing electronic documents (e.g., a legal case reporter repository). In some embodiments, such a repository may be local. For example, the electronic documents may be obtained from the electronic documents data 238*a* of the data storage component 236 (FIG. 2A) as described in greater detail herein. In other embodiments, the documents may be obtained from an offsite data storage repository, such as an electronic document publisher's repository and/or the like. The documents are generally electronic documents and may generally contain information arranged in paragraph form. In some embodiments, the documents may be legal documents, such as, for example, case law, statutory law, pleadings, briefs, legal memos, and/or the like and the electronic documents may contain compiled headnotes, compiled reasons for citing and/or the like.

At block 410, the text within the electronic documents is searched for a plurality of reasons for citing or headnotes. The plurality of reasons for citing or headnotes often contain a plurality of legal issues text and other text relating to the importance of the legal issues discussed such as whether the decision or argument was based on a seminal or landmark case. That is, the plurality of reasons for citing or headnotes may identify potential seminal cases and/or identify the prominent issue that each seminal case discusses. In other words, the legal issue that a seminal case is acknowledged or recognized for may be identified. As such, once the plurality of reasons for citing are identified, the plurality of reasons for citing text is searched, at block 415, to identify seminal clues or keywords that indicate a potential seminal case and generate a data list containing all the reasons for citing or headnotes containing the potential seminal case at block 420. The seminal clues or keywords to be identified may be the keywords or seminal clues stored in the keyword data 238*b* (FIG. 2). These keywords or seminal clues are indicators that, in the opinion of the authoring judge in the reasons for citing or headnotes of a subsequent case to the seminal case, represent a belief and/or authoritative thinking that the referenced or cited case has significance, influence, or is precedential to the current case in terms of the specific piece of law discussed. As such, these authoring judges often times use the keywords or seminal clues to indicated that the case being cited is a seminal case. The keywords or seminal clues may include, for example, a seminal case, a seminal decision, a seminal opinion, a seminal ruling, a seminal decision, a seminal holding, a landmark case, a landmark decision, a landmark opinion, a landmark holding, a landmark ruling, a leading case, a leading decision, a leading opinion, a leading holding, a leading ruling, and the like.

The plurality of potential seminal cases are identified within the data list at block 425 based on the identification of the plurality of seminal cases by searching the plurality of reasons for citing at block 410 with the data list generated containing the plurality of seminal clues at block 420. The data list containing the potential seminal cases is filtered, at block 430 to identify only seminal cases based on a calculated seminal reference frequency and generate a working corpus at block 435. It should be appreciated that the working corpus is generated from the filtered data list. Further, the seminal cases are identified by calculating the frequency that the seminal clues or keywords are mentioned for each potential seminal case, and then removing, from the data list, any potential seminal cases that have a low frequency for keywords. The working corpus of seminal cases corresponds to the plurality of reasons for citing identified from block 410. In some embodiments, there may be more than one citing reference referring to potential seminal cases or more than one reference may cite to potential seminal cases. For example, a hypothetical case Harris v. Fisher reasons for citing includes a hypothetical case Smith v. Jones, and in which Smith v. Jones was mentioned in six instances and each these instances included the seminal clues. The Smith v. Jones case may be a seminal case or it may be a co-reference of a seminal case. As such, further investigation, such as the frequency calculation, is needed to determine whether the Smith v. Jones case is relevant and is in fact a seminal case. During the investigation, it is determined that five of the six instances of Smith v. Jones actually references another case, for example, Younger v. Harris, and the last instance references yet another case Monroe v. Pape. As such, the hypothetical case Smith v. Jones may now be considered a co-seminal reference as it may now be determined that Smith v. Jones is not itself a seminal case for this particular legal issue, but instead Younger v. Harris may be the seminal case. Therefore, because Smith v. Jones only references other cases that may be seminal cases, the Smith v. Jones case, when filtered at blocks 430-435, may be removed from a dataset. The filtering of the keyword and ultimately the case from the dataset is important to ensure that only potential seminal cases based on a seminal reference frequency is contained within the dataset. Accordingly, the dataset includes only seminal cases.

The plurality of legal issues text is mined of all the seminal cases in the working corpus from the plurality of reasons for citing or headnotes at block 440, as determined from the identified seminal cases according to block 435 and based on the plurality of reasons for citing having a plurality of legal issues text according to block 410.

Sentence data that contains a plurality of sentences having text that includes a plurality of legal discussions from the plurality of legal issues of the seminal case is established at block 445 from the plurality of legal issues text of all seminal cases in the working corpus according to block 440. The sentence data isolates the sentences that have the legal discussions that include the plurality of seminal clues. Each sentence of the plurality of sentences within the sentence data with a cited case or references a seminal case is assigned a unique identifier at block 450. An example unique identified sentence may be for the hypothetical case of Harris v. Fisher where the Harris case would be assigned a unique identifier for any relevant sentence such as "More importantly, the Supreme Court concluded, after a thorough review of informed consent cases, that a competent person has a liberty interest under the Due Process Clause in refusing unwarranted medical treatment."

At block 455, a determination is made as to whether there are additional seminal cases in the working corpus containing legal discussions from the plurality of legal issues that have not yet been assigned a unique identifier. If there are additional seminal cases, then the process repeats at block 445. If all seminal cases in the working corpus have had a unique identifier assigned to each sentence at block 450, the process may continue at block 460. For each of the plurality of seminal cases, all of the plurality of sentences in the sentence data is collected at block 460 and stored as a temporary sentence data for each seminal case, at block 465, within the seminal case data 238*d* (FIG. 2).

A text clustering algorithm may be utilized or applied to each sentence of the plurality of sentences with the unique identifier and stored as the temporary sentence data to create a plurality of text clusters at block 470. The test clustering algorithm may be used to identify the sentences within the reason for citing text that potentially address the seminal issue. That is, the text clustering algorithm is configured to analyze the plurality of sentences within the temporary sentence data by transforming the text of the plurality of sentences into transformed data so that the algorithm may create a plurality of cluster-wise tags that are representative of the data contained in these clusters. The transformed data is then normalized and the transformed data is analyzed using a plurality of text clustering tools (i.e., open source tools such as RapidMiner, KNIME Analytics, Open Calais, and/or the like) to determine the data that is most representative to the seminal issues while removing the data that is not representative of the key legal issues.

At least one top cluster is selected from the plurality of text clusters at block 475. The at least one top cluster includes one or more sentences that discuss a seminal legal issue for a particular seminal case. It should be appreciated that when there are two clusters that include one or more sentences that discuss a seminal legal issue for a particular seminal case, human editors may determine whether one or both clusters are used. It should also be appreciated that by selecting at least one top cluster, the other sentences from the plurality of reasons for citing or headnotes are removed from the temporary sentence data. More specifically, the system is biased towards sentences that recite the keywords (i.e., words such as "leading", "seminal", and/or the like). Thus, the sentences within the reason for citing text that are not focused on a seminal legal issue for a particular seminal case may be discarded. With the at least one top cluster identified, the data corresponding to the seminal cases from the working corpus is output at block 480. The output data causes an external device, such as the user computing device 102*a* to distinguish the seminal cases when one or more of the seminal cases are returned as the result of a search.

The data that is output is based on the at least one top cluster selected from the plurality of text clusters at block 475. It should be appreciated that the data, including metadata, may be used by a user computing device 102*a* (FIG. 1) to display search results in a manner to distinguish or otherwise indicate the presence of the seminal cases. However, it should be understood that the data may also be outputted according to block 475 to other devices that utilize the data in other ways (e.g., not for indicating documents in search results).

Figure 5:
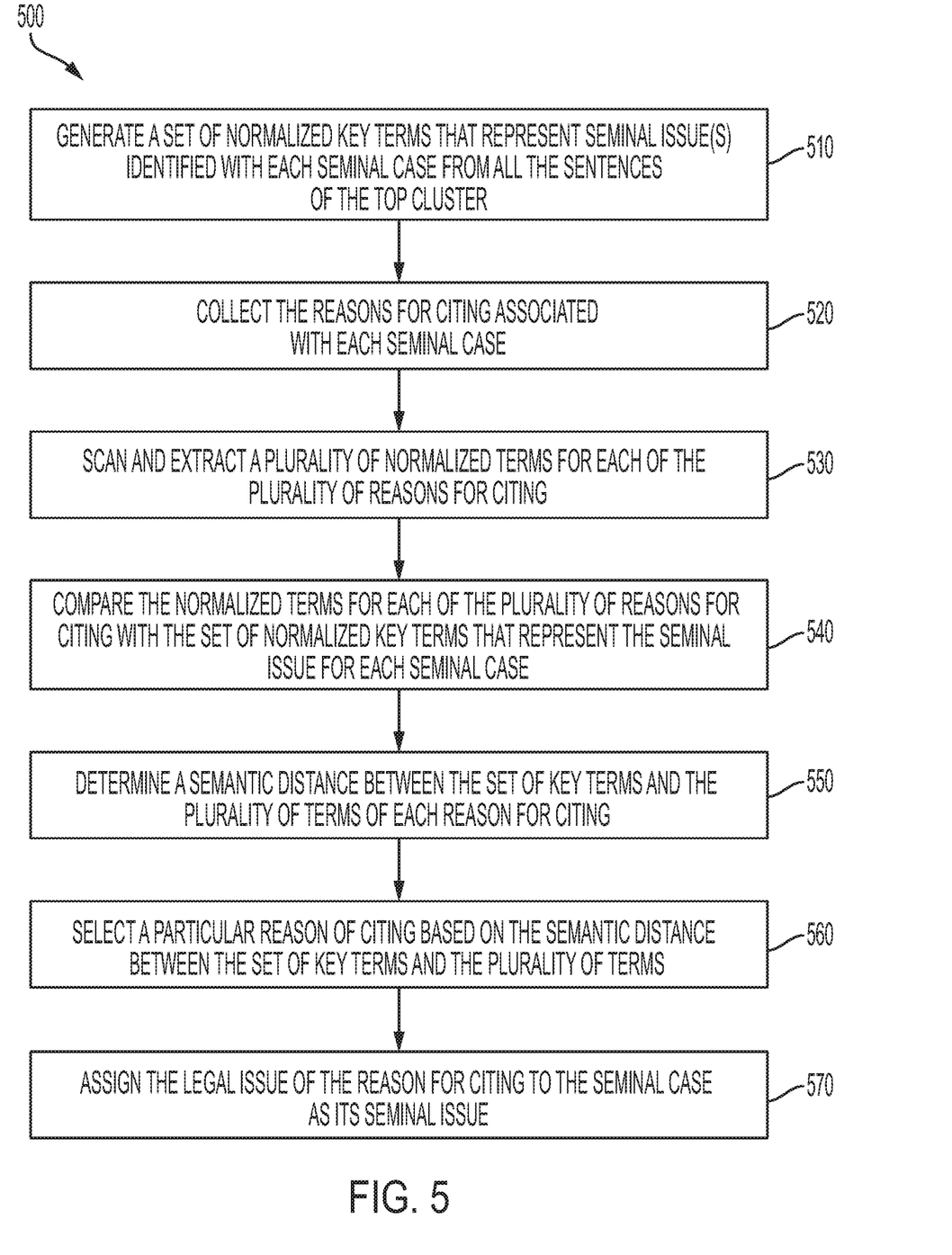
FIG. 5 depicts a flow diagram of an illustrative method of selecting a reason for citing to represent a seminal issue according to one or more embodiments described and illustrated herein.

With reference to FIG. 5, a flow diagram that graphically illustrates an illustrative method 500 of selecting the reason for citing to represent the seminal issue according to one or more embodiments is provided. In embodiments, once the at least one top cluster is selected, a set of normalized key terms that represent the seminal issue or issues identified with each seminal case from all the sentences of the at least one top cluster at block 510. That is, the text clustering algorithm is utilized to analyze the plurality of cluster-wise tags that are representative of the data contained in these clusters to identify the data that is most representative to the seminal issues such that the top cluster having the most relevant sentences may be identified and the data within those sentences may be searched to identify the set of key terms that represent the seminal legal issue. The identification of the normalized set of key terms may be calculated based on term weights and frequencies. The plurality of reasons for citing associated with each seminal case are collected at block 520. The plurality of reasons for citing is scanned and a plurality of normalized terms may be extracted from the plurality of reasons for citing at block 530. For instance, the term "US citizen" may be described in a plurality of similar terms. That is, the term "US citizen" may also be referred to a "citizen of the United States", "United States citizen", "U.S. citizen" "citizens of the United States", "citizen of United States" and the like. Therefore, the key terms may be referred to as normalized key terms.

At block 540, once the normalized set of key terms is extracted, the normalized key terms for each of the plurality of reasons for citing that were extracted in block 530 is compared with the set of normalized key terms that represent the seminal issue from each seminal case that were generated at block 510. A semantic distance between the set of key terms identified in the plurality of reasons for citing and the plurality of terms of each plurality of reasons for citing is determined at block 550. The semantic distance may be determined by calculating a cosine similarity between the normalized key terms with the plurality of terms within the plurality of reasons for citing terms. The cosine similarity may be a calculation using a cosine angle theta between the vector of the normalized key terms and the vector of the plurality of terms so to determine, based on the value of theta, whether the terms are similar. That is, each of the plurality of terms within the plurality of reasons for citing have a term vector that can be calculated as being the closest to the normalized key terms, which is then selected to represent the seminal issue. In one embodiment, the system may identify two different top text clusters that are both focused on distinct issues. If two top text clusters are identified, then the system may select two reasons for citing (i.e., one reason for citing for each top text cluster). If necessary, an individual may review both reasons for citing and select one of them as the headnote to represent the seminal issue.

A particular reason for citing based on the semantic distance between the set of key terms and the plurality of terms, as discussed above with reference to block 550, may then be selected at block 560. The particular reasons for citing may represent the seminal issue addressed by the seminal case. The legal issue of the reason for citing to the seminal case as its seminal issue is then assigned at block 570.

Referring now to FIG. 6, the graphical user interface 600 includes a legal issue query field 610 and a result listing 620. The legal issue query field 610 is configured to request a submission of a legal issue search query from a user. In some embodiments, a text input may be provided in the legal issue query field 610, such as the illustrative user inputted terms "search and seizure" as depicted in FIG. 6. In some embodiments, a user may have been presented a separate search screen (e.g., a user interface with a search box and a "search" button or a search box that immediately causes a search to run when text is inputted) used by the user to enter the search query, such as by typing the legal issue search query into the search box.

The search results 620 display a plurality of cases related to the legal issue searched. The cases displayed in the search results 620 are provided with the seminal cases 630, 640 moved to the top of the search result listing. That is, in regards to the legal issue search query "search and seizure," two seminal cases 630, 640 are identified and moved to the top of the search results 620. The first seminal case is *Katz* v. *United States* and the second seminal case is *Terry* v. *Ohio*. As such, the interface is provided such that the user can visually identify these two cases as two seminal cases related to the legal issue search of "search and seizure". The data used to identify and indicate the seminal cases in the search results is the result of data that was received as a result of the processes described herein with respect to FIG. 4. It should be appreciated that the seminal cases may not be pushed or moved to the top of the search results, but instead may be indicated or distinguished in other ways such as highlighted, starred, marked, and/or the like so that visually, the user would easily recognize that these cases are the seminal cases for that particular legal issue.

It should be appreciated that the disclosed systems, methods, and computer program products are configured to identify one or more seminal cases within a database containing various text documents. More specifically, the disclosed systems, methods and computer program products provide an approach to identify one or more seminal cases and the legal issues that are addressed by a particular seminal case by mining a text database containing legal documents. Conventionally, seminal cases and their corresponding legal issues stored in a database are not marked or otherwise identified. This is because it is usually not known at the time of publication whether a case will eventually become particularly significant in a particular field of law. Moreover, the disclosed systems, methods, and computer program products transmit data to a search computer for the purposes of improving search results. Furthermore, the disclosed method employs a novel or unconventional approach to mine a text document database for one or more seminal cases and the corresponding issues that each case addresses.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system to identify one or more seminal cases that address a particular legal issue, the system comprising:
   a processing device; and
   a non-transitory, processor-readable storage medium in communication with the processing device, the non-transitory, processor-readable storage medium comprising one or more programming instructions that, when executed, cause the processing device to:
      obtain an electronic legal document comprising a plurality of text from a repository,
      search the plurality of text of the electronic legal document for a plurality of reasons for citing comprising a plurality of legal issues text,
      search the plurality of reasons for citing to identify a plurality of seminal clues, the plurality of seminal clues being weighted indicators based on a significance and an influence placed by an authoring judge on a specific piece of law discussed in the plurality of legal issues text,
      generate a data list from the plurality of reasons for citing having the plurality of seminal clues to identify a plurality of potential seminal cases,
      filter the data list containing the plurality of potential seminal cases to identify only seminal cases based on a calculated seminal reference frequency and generate a working corpus from the filtered data list, and
      output data corresponding to the seminal cases from the working corpus such that the data causes an external device to distinguish the seminal cases when one or more of the seminal cases are returned as the result of a search.

2. The system of claim 1, wherein the calculated seminal reference frequency is determined by a predetermined set of rules configured to determine the amount of times a particular case is cited as a seminal case to establish a frequency.

3. The system of claim 1, wherein the reasons for citing text is a headnote text.

4. The system of claim 1, wherein the non-transitory, processor-readable storage medium further comprising one or more programming instructions that, when executed, cause the processing device to:
   mine the plurality of legal issues text from the plurality of reasons for citing of all the seminal cases in the working corpus to establish sentence data that contains a plurality of sentences comprising a plurality of legal discussions from the plurality of legal issues text of the seminal cases in the working corpus,
   assign a unique identifier to each sentence of the plurality of sentences that reference the seminal cases,
   collect the sentences of the plurality of sentences from the sentence data for each seminal case in the working corpus,
   store the collected sentences from the sentence data as temporary sentence data for each of the seminal cases in the working corpus,
   apply a text clustering algorithm to the temporary sentence data to create a plurality of text clusters, and
   select a top cluster from the plurality of text clusters, wherein the top cluster comprises one or more sentences surrounding the plurality of legal issues text identified with each of the seminal cases.

5. The system of claim 4, wherein selecting the top cluster from the plurality of text clusters of the temporary sentence data removes the sentences from temporary sentence data that are not focused on the plurality of legal issues text identified with seminal cases.

6. The system of claim 4, wherein the top cluster is a plurality of sentences.

7. The system of claim 4, wherein the non-transitory, processor-readable storage medium further comprising one or more programming instructions that, when executed, cause the processing device to:
   generate a set of normalized key terms that represent seminal issues identified with each seminal case from the one or more sentences of the top cluster,
   collect the plurality of reasons for citing associated with each seminal case,
   scan and extract a plurality of normalized terms for each of the plurality of reasons for citing,
   compare the set of normalized key terms with the plurality of normalized terms,
   determine a semantic distance between the set of normalized key terms and the plurality of normalized terms of each reasons for citing,
   select a particular reason of citing based on the semantic distance between the set of normalized key terms and the plurality of normalized terms, and
   assign the particular legal issue of the plurality of legal issues text of the reasons for citing to the seminal case as the seminal issue.

8. The system of claim 7, wherein the selected reason of citing is a centroid of at least one of the seminal issues in the seminal case.

9. The system of claim 7, wherein:
   the semantic distance is determined by calculating a cosine similarity between the set of normalized key terms and the plurality of normalized terms for each of the plurality of reasons for citing, and
   a selected term of the plurality of normalized terms for each of the plurality of reasons for citing is a vector closest to the set of normalized key terms.

10. A method to identify one or more seminal cases that address a particular legal issue, the method comprising:
   obtaining, by a processing device, an electronic legal document comprising a plurality of text from a repository;
   searching, by the processing device, the plurality of text of the electronic legal document for a plurality of reasons for citing comprising a plurality of legal issues text;
   searching, by the processing device, the plurality of reasons for citing to identify a plurality of seminal clues, the plurality of seminal clues being weighted indicators based on a significance and an influence placed by an authoring judge on a specific piece of law discussed in the plurality of legal issues text;
   generating, by the processing device, a data list from the plurality of reasons for citing having the plurality of seminal clues to identify a plurality of potential seminal cases;
   filtering, by the processing device, the data list containing the plurality of potential seminal cases to identify only seminal cases based on a calculated seminal reference frequency and generate a working corpus from the filtered data list;
   mining, by the processing device, the plurality of legal issues text from the plurality of reasons for citing of all the seminal cases in the working corpus to establish sentence data that contains a plurality of sentences comprising a plurality of legal discussions from the plurality of legal issues text of the seminal cases in the working corpus;
   assigning, by the processing device, a unique identifier to each sentence of the plurality of sentences that references the seminal cases;
   collecting, by the processing device, each sentence of the plurality of sentences from the sentence data and storing the collected sentences from the sentence data as temporary sentence data for each of the seminal cases in the working corpus;
   applying, by the processing device, a text clustering algorithm to the temporary sentence data to create a plurality of text clusters;
   selecting, by the processing device, a top cluster from the plurality of text clusters, wherein the top cluster comprises one or more sentences surrounding the plurality of legal discussions and the plurality of legal issues text identified with each of the seminal cases; and
   outputting, to a user display device, data corresponding to the seminal cases from the working corpus such that the data causes the user display device to distinguish the seminal cases when one or more of the seminal cases are returned as the result of a search.

11. The method of claim 10, wherein calculated seminal reference frequency is determined by a predetermined set of rules configured to determine the amount of times a particular case is cited as a seminal case to establish a frequency.

12. The method of claim 10, wherein the reasons for citing text is a headnote text.

13. The method of claim 10, wherein selecting the top cluster from the plurality of text clusters of the temporary sentence data removes the sentences from the reasons for citing text that are not focused on the plurality of legal issues text identified with seminal cases.

14. The method of claim 10, further comprising:
generating, by the processing device, a set of normalized key terms that represent seminal issues identified with each seminal case from the one or more sentences of the top cluster;
collecting, by the processing device, the plurality of reasons for citing associated with each seminal cases;
scanning and extracting, by the processing device, a plurality of normalized terms for each of the plurality of reasons for citing;
comparing, by the processing device, the set of normalized key terms with the plurality of normalized terms for each of the plurality of reasons for citing;
determining, by the processing device, a semantic distance between the set of normalized key terms and the plurality of normalized terms;
selecting, by the processing device, a particular reason of citing based on the semantic distance between the set of normalized key terms and the plurality of normalized terms; and
assigning, by the processing device, the particular legal issue of the plurality of legal issues text of the reasons for citing to the seminal case as the seminal issue.

15. The method of claim 14, wherein the selected reason of citing is a centroid of at least one of the plurality of legal issues text in the seminal case.

16. The method of claim 14, wherein:
the semantic distance is calculated by calculating a cosine similarity between the set of normalized key terms and the plurality of normalized terms for each of the plurality of reasons for citing, and
wherein the term of the plurality of normalized terms for each of the plurality of reasons for citing is a vector closest to the set of normalized key terms.

17. A non-transitory, computer-readable storage medium that is operably by a computer to identify one or more seminal cases that address a particular legal issue, the non-transitory, computer-readable storage medium comprising one or more programming instructions stored thereon for causing a processing device to:
obtain an electronic legal document comprising a plurality of text from a repository,
search the plurality of text of the electronic legal document for a plurality of reasons for citing comprising a plurality of legal issues text,
search the plurality of reasons for citing to identify a plurality of seminal clues and generate a data list from the plurality of reasons for citing having the plurality of seminal clues to identify a plurality of potential seminal cases, the plurality of seminal clues being weighted indicators based on a significance and an influence placed by an authoring judge on a specific piece of law discussed in the plurality of legal issues text,
filter the data list containing the plurality of potential seminal cases to identify only seminal cases based on a calculated seminal reference frequency and generate a working corpus from the filtered data list, and
output data corresponding to the seminal cases from the working corpus such that the data causes an external device to distinguish the seminal cases when one or more of the seminal cases are returned as the result of a search.

18. The non-transitory, computer-readable storage medium of claim 17 further comprising one or more programming instructions stored thereon for causing the processing device to:
mine the plurality of legal issues text from the plurality of reasons for citing of all the seminal cases in the working corpus to establish sentence data that contains a plurality of sentences comprising a plurality of legal discussions from the plurality of legal issues text of the seminal cases in the working corpus,
assign a unique identifier to each sentence of the plurality of sentences that reference the seminal cases in the working corpus,
collect each sentence of the plurality of sentences from the sentence data,
store the collected sentences from the sentence data as temporary sentence data for the seminal cases in the working corpus,
apply a text clustering algorithm to the temporary sentence data to create a plurality of text clusters, and
select a top cluster from the plurality of text clusters, wherein the top cluster comprises one or more sentences surrounding the plurality of legal issues text identified with seminal cases.

19. The system of claim 18, wherein selecting the top cluster from the plurality of text clusters of the temporary sentence data removes the sentences from temporary sentence data that are not focused on the plurality of legal issues text identified with seminal cases.

20. The non-transitory, computer-readable storage medium of claim 18 further comprising one or more programming instructions stored thereon for causing the processing device to:
generate a set of normalized key terms that represent seminal issues identified with the seminal cases from the one or more sentences of the top cluster,
collect the plurality of reasons for citing associated with the seminal case,
scan and extract a plurality of normalized terms for each of the plurality of reasons for citing,
compare the set of normalized key terms with the plurality of normalized terms,
determine a semantic distance between the set of normalized key terms and the plurality of normalized terms, and
select a reason of citing based on the semantic distance between the set of normalized key terms and the plurality of normalized terms and
assign the particular legal issue of the plurality of legal issues text of the reasons for reason for citing to the seminal case as the seminal issue.

* * * * *